Jan. 6, 1953 R. A. ASHTON 2,624,224
APPARATUS FOR DRIVING ROTATABLE WORKPIECES
Filed Nov. 1, 1947
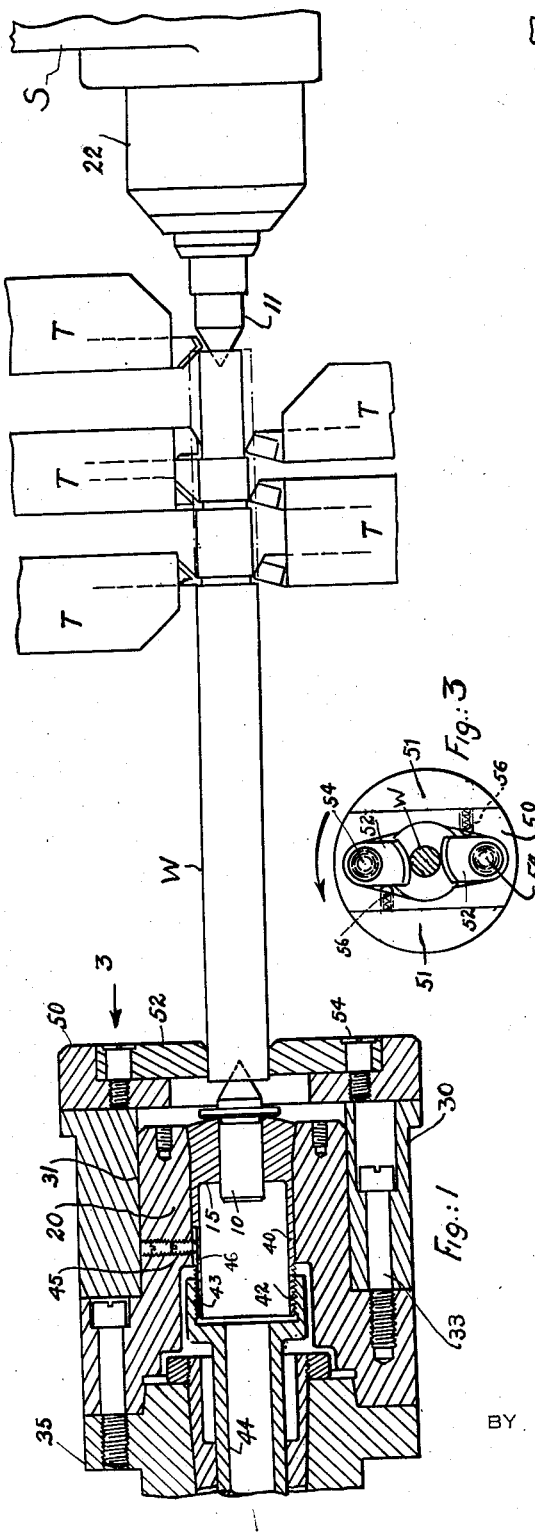
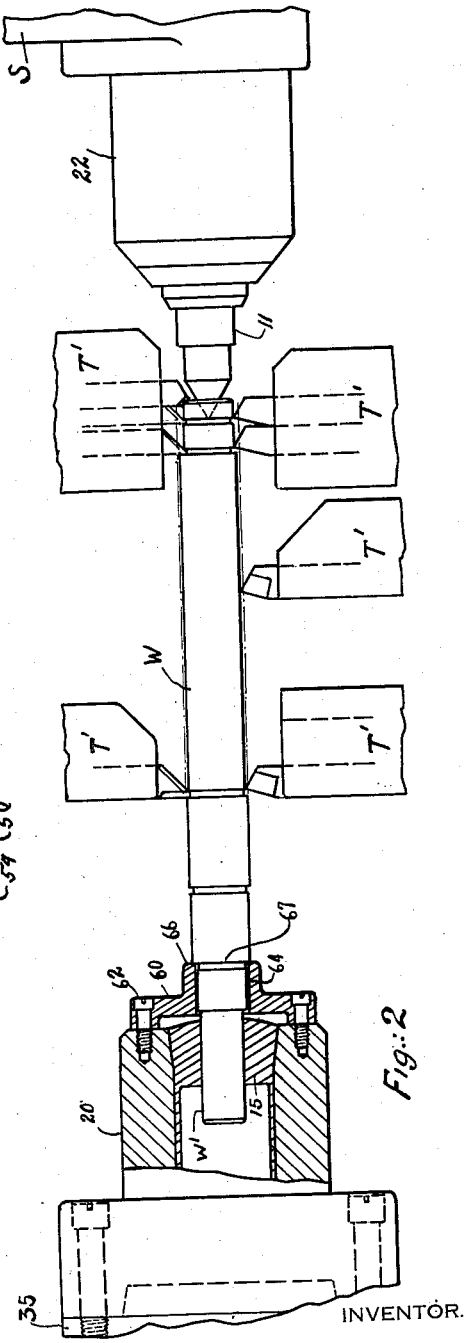
INVENTOR.
Richard A. Ashton
BY Chas. T. Hawley
ATTORNEYS.

Patented Jan. 6, 1953

2,624,224

UNITED STATES PATENT OFFICE 2,624,224

APPARATUS FOR DRIVING ROTATABLE WORKPIECES

Richard A. Ashton, Seneca Falls, N. Y., assignor to Seneca Falls Machine Company, Seneca Falls, N. Y., a corporation of Massachusetts Application November 1, 1947, Serial No. 783,557

1 Claim. (Cl. 82—40)

This invention relates to lathes, grinding machines and other machine tools in which a piece of work, such as a shaft or rod, is supported and rotated during machine operations thereon.

It is the general object of the invention to provide improved apparatus by which a piece of work may be engaged and driven while mounted on centers, or may alternately be supported and rotated by a collet-type chuck.

A further object of the invention is to provide means for accurately positioning a piece of work axially when it is to be held and driven by a chuck or collet.

The invention further relates to arrangements and combinations of parts which will be hereinafter described and more particularly pointed out in the appended claim.

A preferred form of the invention is shown in the drawings, in which

Fig. 1 is a plan view, partly in section, of my improved work-driving apparatus, with the work on centers;

Fig. 2 is a plan view of the apparatus as arranged for a chuck or collet drive; and Fig. 3 is a transverse elevation of certain parts, looking in the direction of the arrow 3 in Fig. 1.

Referring to the drawings, I have shown a piece of work W mounted on centers 10 and 11. The live center 10 may be gripped and held by collet jaws 15 in a chuck 20, and the dead center 11 is mounted in the slide 22 of a tail stock S.

A cylindrical member or sleeve 30 is centered at 31 on the chuck 20 and is detachably secured thereto by a plurality of clamping screws 33. The chuck 20 in turn is secured to a driving spindle 35 which may be supported and rotated in any usual manner.

The collet jaws 15 are formed on a sleeve 40, which sleeve is axially slidable in the chuck 20 and has its rear end portion threaded at 42 into the enlarged and recessed front end 43 of the usual collet support and drawbar 44. The sleeve 40 is held from rotation in the chuck 20 by a screw 45 projecting into a keyway 46.

A slide 50 is mounted for transverse movement between guides 51 (Fig. 3) at the front end of the sleeve 30, and a pair of driving dogs 52 are pivoted on studs 54 threaded into the slide 50. Coil springs 56 are pivotally mounted in pockets in the slide 50 and tend to turn the driving dogs 52 anti-clockwise as viewed in Fig. 3 and to thereby engage said dogs with the work.

The driving faces of the dogs 52 are eccentric with respect to their studs 54, so that they are well adapted to engage and drive a piece of work W supported on the centers 10 and 11, even if the outer surface of the work piece is irregular or slightly eccentric with respect to the axis of the work centers. The slide 50 may shift slightly to equalize the driving pressures.

A piece of relatively rough stock may thus be mounted on the centers 10 and 11 and rotated by the driving dogs 52, while one or more lathe tools T engage the tail portion of the work and perform various desired operations thereon as suggested in Fig. 1.

If it is then desired to reverse the work piece W and perform machine operations on the opposite end portion, the live center 10 may be removed and the finished portion W' of the work piece may be inserted in the collet jaws 15, as shown in Fig. 2.

The collet may then be tightened on the work piece by drawing the jaws axially into the chuck 20. The work will thereafter be centered and rotated by the collet jaws 15 of the chuck 20.

During this operation, the driver dogs 52 may supply additional driving force, or they may be removed if there is any danger of injury to a highly finished surface.

If it is desired to provide accurate axial spacing between shoulders on the work produced in the first and second operations respectively, the ring member 30, together with the driving dogs 52, may be entirely removed as shown in Fig. 2, and a disc or collar 60 may be secured to the outer face of the chuck 20 by screws 62. This collar is provided with an axial recess 64 large enough to loosely receive the work piece W and also has a finished end surface 66 adapted to engage a shoulder 67 on the work piece and to thus provide an accurate gauging point for further operations.

The collet jaws 15, by their slight withdrawing movement, will insure that the gauging surfaces 66 and 67 are firmly abutted. Tools T' may then be utilized to complete the desired operations on the work piece W.

I have thus provided very convenient apparatus by which a work piece may be centered, driven and finished at one end, and may thereafter be chucked and accurately positioned axially for further finishing operations on the other end of the work piece.

Having thus described my invention and the advantages thereof, I do not wish to be limited to the details herein disclosed, otherwise than as set forth in the claim, but what I claim is:

Work-driving apparatus comprising a chuck member, means to rotate and support said chuck member, collet jaws in said chuck operative to engage and drive the work, means to open and close said jaws, a gauge plate for axially positioning the work, and means to secure said gauge plate to the outer face of the chuck member, said gauge plate having an axial opening therein surrounded by an outwardly projecting tubular boss to loosely receive and pass the work therethrough for engagement with said collet jaws, the bore formed by said boss having a diameter equal to the diameter of said axial opening and said bore and said axial opening having a constant diameter throughout their lengths, and said boss having an outer end surface to engage and axially position a shoulder on the work.

RICHARD A. ASHTON.

REFERENCES CITED

The following references are of record in the file of this patent:

UNITED STATES PATENTS

| Number | Name | Date |
|---|---|---|
| 815,877 | Taylor | Mar. 20, 1906 |
| 1,171,406 | Avery | Feb. 15, 1916 |
| 1,200,047 | Thomson | Oct. 3, 1916 |
| 1,256,131 | Hervig | Feb. 12, 1918 |
| 1,829,619 | Svenson | Oct. 27, 1931 |
| 1,849,539 | Branigan | Mar. 15, 1932 |
| 1,912,987 | Lovely | June 6, 1933 |
| 2,119,004 | Bowser | May 31, 1938 |

FOREIGN PATENTS

| Number | Country | Date |
|---|---|---|
| 491,921 | Germany | Feb. 17, 1930 |
| 511,975 | Great Britain | Aug. 28, 1939 |